United States Patent
Alonso et al.

(10) Patent No.: US 10,330,950 B2
(45) Date of Patent: Jun. 25, 2019

(54) PROGRESSIVE LENSES WITH REDUCED PERIPHERAL MEAN SPHERE

(71) Applicant: Indizen Optical Technologies of America, LLC, Torrance, CA (US)

(72) Inventors: José Alonso, Madrid (ES); José Miguel Cleva, Madrid (ES); Eduardo Pascual, Madrid (ES); Lidia Garcia, Madrid (ES); Daniel Crespo, Torrance, CA (US); Marcos Garcia, Torrance, CA (US)

(73) Assignee: Indizen Optical Technologies of America, LLC, Torrance, CA (US)

( * ) Notice: Subject to any disclaimer, the term of this patent is extended or adjusted under 35 U.S.C. 154(b) by 0 days.

(21) Appl. No.: 15/440,856

(22) Filed: Feb. 23, 2017

(65) Prior Publication Data

US 2018/0239167 A1  Aug. 23, 2018

(51) Int. Cl.
  *G02C 7/02* (2006.01)
  *G02C 7/06* (2006.01)

(52) U.S. Cl.
  CPC ............ *G02C 7/028* (2013.01); *G02C 7/027* (2013.01); *G02C 7/061* (2013.01)

(58) Field of Classification Search
  CPC ........ G02C 7/024; G02C 7/027; G02C 7/028; G02C 7/06; G02C 7/061
  USPC .................................................... 351/159.74
  See application file for complete search history.

(56) References Cited

U.S. PATENT DOCUMENTS

| | | |
|---|---|---|
| 4,461,550 A | 7/1984 | Legendre |
| 4,537,479 A | 8/1985 | Shinohara et al. |
| 4,676,610 A | 6/1987 | Barkan et al. |
| 4,786,160 A | 11/1988 | Furter |
| 4,838,675 A | 6/1989 | Barkan et al. |
| 4,854,689 A | 8/1989 | Dufour et al. |
| 4,861,153 A | 8/1989 | Winthrop |
| 5,123,725 A | 6/1992 | Winthrop |
| 5,488,442 A | 1/1996 | Harsigny et al. |
| 5,861,935 A | 1/1999 | Morris et al. |
| 6,231,184 B1 | 5/2001 | Menezes et al. |
| 6,260,967 B1 | 7/2001 | Edwards et al. |
| 6,318,859 B1 * | 11/2001 | Baudart .............. G02C 7/025 351/159.42 |
| 6,652,096 B1 | 11/2003 | Morris et al. |
| 6,793,340 B1 | 9/2004 | Morris et al. |
| 6,956,682 B2 | 10/2005 | Wooley |
| 7,229,173 B2 | 6/2007 | Menezes |
| 7,475,985 B2 | 1/2009 | Blum et al. |

(Continued)

OTHER PUBLICATIONS

World Intellectual Property Organization, International Search Report and Written Opinion for International Application No. PCT/US2018/018245, dated Mar. 8, 2018, 9 total pages.

*Primary Examiner* — William R Alexander
(74) *Attorney, Agent, or Firm* — SoCal IP Law Group LLP; Mark Andrew Goldstein (57) ABSTRACT

An improved method for configuring progressive ophthalmic lenses is disclosed. The method includes computing a traditional merit function with two changes. First, the merit function computation is limited by calculating only a preferred distance from the meridian rather than until 0. Second, an additional term is added to the merit function that calculates the mean sphere at a point that is at a reduced range from the maximum unwanted cylinder, rather than the entire range.

15 Claims, 5 Drawing Sheets

(56) References Cited

U.S. PATENT DOCUMENTS

| | | | |
|---|---|---|---|
| 9,557,578 B2* | 1/2017 | Moine | G02C 7/028 |
| 2004/0263778 A1* | 12/2004 | Wooley | G02C 7/028 |
| | | | 351/159.42 |
| 2005/0122470 A1* | 6/2005 | Perrott | G02C 7/02 |
| | | | 351/159.01 |
| 2011/0187993 A1* | 8/2011 | Alonso Fernandez | ...................... |
| | | | G02C 7/061 |
| | | | 351/159.42 |
| 2012/0300172 A1* | 11/2012 | Berthezene | G02C 7/028 |
| | | | 351/159.76 |

* cited by examiner

© 2017 INDIZEN OPTICAL TECHNOLOGIES OF AMERICA, LLC

PROGRESSIVE LENSES WITH REDUCED PERIPHERAL MEAN SPHERE

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to ophthalmic lenses used for both distance vision and near vision known as progressive addition lenses.

Description of the Related Art

Progressive addition lenses are configured in an attempt to allow a wearer to comfortably transition between lens powers within the lens in a smooth and seamless manner. To achieve this the configuration of progressive ophthalmic lenses typically uses the following merit function.

$$\Phi_0 = \sum_{i=1}^{N} \alpha_i (C_i - C_{0i})^2 + \sum_{i=1}^{N} \beta_i (A_i - A_{0i})^2 + \sum_{i=1}^{N} \gamma_i (S_i - S_{0i})^2 + \sum_{k=1}^{M_c} \delta_k C_k^2 + \sum_{k=1}^{M_c} \epsilon_k (S_k - S_{0k})^2$$

In the merit function, i is an index which allows for evaluation of the possible sight directions to consider for the principal meridian of the progressive lens. For example, a grid of points regularly or irregularly scattered over the lens may be selected, and the gaze directions passing through each of these points may be evaluated. The index i traverses sight directions scattered or distributed over the lens. The index k traverses sight directions that pass through the principal meridian. In the merit function, $C_{0i}$ and $A_{0i}$ are the desired or optimal cylinder and cylinder axis at point i, whereas $C_i$ and $A_i$ are the cylinder and cylinder axis the lens actually has at the particular point i at a particular stage during optimization. Similarly, $S_{0i}$ is the desired or optimal sphere at point i, and $S_i$ is the sphere the lens actually has at this point at a particular stage during optimization. The variables $\alpha_i, \beta_i$ and $\gamma_i$ are numbers used as weights that give different importance to different points. There are $N_c$ sight directions going through the principal meridian of the progressive lens. These sight directions may be evenly distributed along the principal meridian, from the top to the bottom of the lens. The target astigmatism at the principal meridian is zero (in which case, there is no $C_{0k}$), and the target sphere values at the principal meridian are $S_{0k}$. The values $C_k$ and $S_k$ are the actual values of cylinder and sphere that the lens has at each point on the principal meridian. The variables $\delta_k$ and $\epsilon_k$ are weights used to optimize the cylinder and sphere along the principal meridian.

At multiple stages during optimization of a progressive lens design, the actual cylinder and sphere produced by the lens are calculated, and the value of the merit function $\Phi_0$ is computed. The theoretical surface of the lens is modified, and the merit function $\Phi_0$ is recomputed and compared with the previous value of the merit function for the previous point. This is reflected in the range i=1 through N in summations in the merit function. If the new value is smaller, the surface modifications are deemed acceptable. In this way, the merit function is evaluated through all points until the smallest possible value of the merit function $\Phi_0$ is achieved.

The prior paragraphs present a simplified description of the optimization process for progressive lens construction, and the actual process may differ considerably, though the final objective is the same: to produce a lens with distributions of C, A and S as similar as possible to the proposed objective distribution of $C_0, A_0$ and $S_0$ over the entire lens, but especially on the principal meridian of the lens.

However, a problem with the traditional merit function used in progressive addition lens design is that the power components S, C and A are not independent of one another. These power components cannot be distributed independently over the lens surface. In practice, the resulting distributions of $C_0$, $A_0$ and $S_0$ are not correctly established on the lens such that the optimization of the merit function yields less than optimal and sometimes incorrect results. This causes progressive lenses to be less than optimal and sometimes unsatisfactory to the lens wearing consumer.

DETAILED DESCRIPTION

Progressive ophthalmic lenses are configured using a merit function which takes into consideration the requirements for lens optical power of a user at different distances. Lens optical power is defined by three components: sphere S, cylinder C and cylinder axis A.

Figure 1:
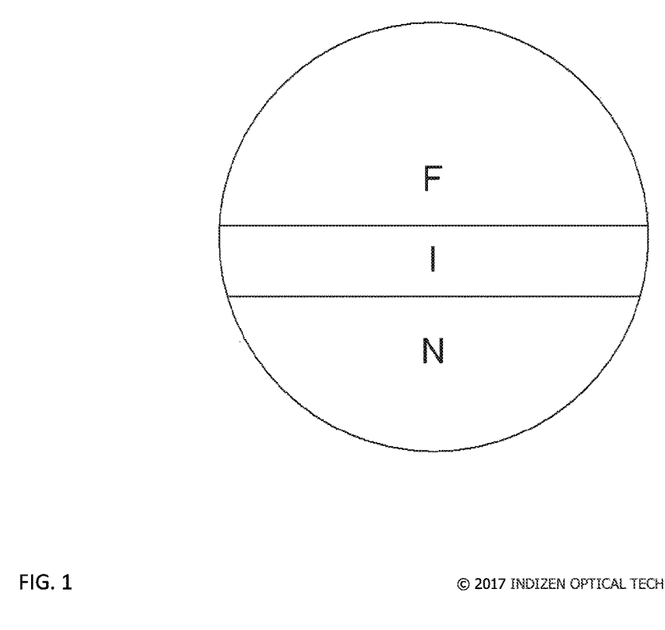
FIG. 1 is a two-dimensional map of an ophthalmic lens showing far, intermediate and near portions.
Figure 2A:
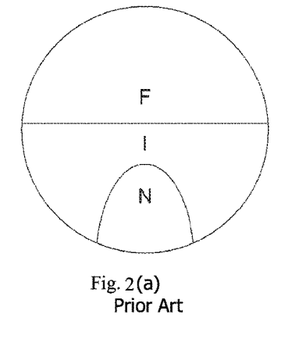
FIG. 2(a), is a first prior art example two-dimensional map of a prior art ophthalmic lens having far, intermediate and near portions configured according to a traditional merit function.
Figure 2B:
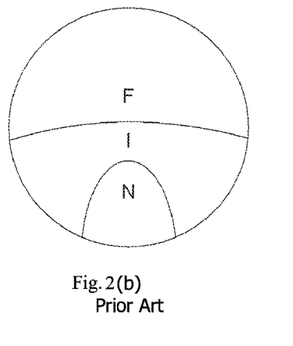
FIG. 2(b), is a second prior art example two-dimensional map of a prior art ophthalmic lens having far, intermediate and near portions configured according to a traditional merit function.
Figure 2C:
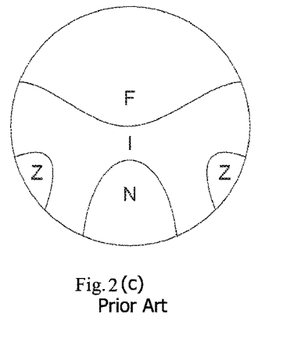
FIG. 2(c), is a third prior art example two-dimensional map of a prior art ophthalmic lens having far, intermediate and near portions configured according to a traditional merit function.

Referring now to FIG. 1, a distribution of a mean sphere for a progressive addition lens is shown as a two-dimensional map. In FIG. 1, an ideal distribution is presented. The lens is distributed into three zones marked F, I and N representing F for far, I for intermediate and N for near vision. That is, the lens power for far, intermediate and near is located in each of the regions F, I and N. In the regions F and N, the mean sphere is ideally constant, whereas in the region I the power smoothly changes from the value at F to the value at N (when viewed from top to bottom). In practice, the ideal distribution shown in FIG. 1 cannot be achieved because of physical constraints on the geometry of a lens. Instead, lens power distributions like those shown in FIGS. 2(a), (b) and (c) result. In the prior art, two-dimensional lens mappings shown in FIGS. 2(a), (b) and (c), the size of the near region N is reduced from what is desirable (as shown in FIG. 1). In addition, the intermediate region I extends to the bottom and to the left and right sides of the near region N. The area Z on the lens in FIG. 2(c), either too near, too far or undetermined. Although the lenses shown in FIG. 2 represent current practice, the lenses result in less than optimal configurations.

Figure 3A:
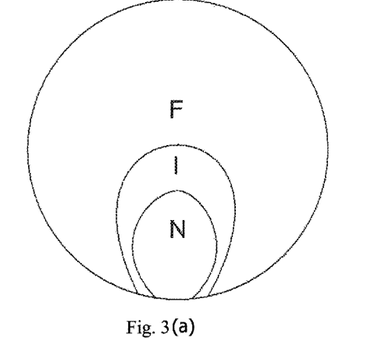
FIG. 3(a) is a first two-dimensional map of an ophthalmic lens having far, intermediate and near portions configured according to the improved merit function disclosed herein.
Figure 3B:
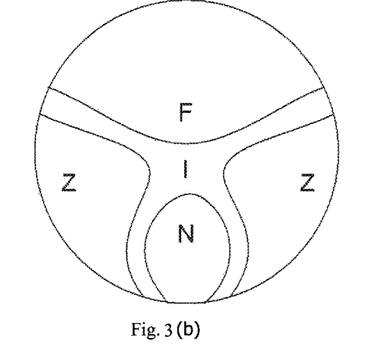
FIG. 3(b) is a second two-dimensional map of an ophthalmic lens having far, intermediate and near portions configured according to the improved merit function disclosed herein.

According to the methods described herein, lenses may be configured so that the value of the mean sphere in the intermediate region I is greatly reduced. This reduction is achieved by the improved method described below and results in lens power distributions like those in example resulting lenses shown as two-dimensional lens maps shown in FIGS. 3(a) and 3(b). The area Z on the lens in FIG. 3(b) is too near, too far or undetermined, but does not impact the functionality of the lens or the customer satisfaction with the lens.

To reduce the mean sphere at both sides of the near region of the progressive lens, two changes are made resulting in an improved progressive addition lens. The result is the improved merit function which is calculated as $\Phi = \Phi'_0 + \Phi_1$.

First, the cylinder used in the computation of the traditional merit function $\Phi_0$ is relaxed or reduced. In one embodiment, the cylinder used in the computation of $\Phi_0$ is not required to be zero or negligible below the point located 4 mm below the near reference point of the lens. In other embodiments, the cylinder used in the computation of $\Phi_0$ is not required to be zero or negligible below a selected point located in an area from 3 mm to 8 mm below the near reference point of the lens. This relaxation of the cylinder produces a reduction of the horizontal size (also referred to as the width) of the near region N at the bottom of the lens, as shown in FIGS. 3(a) and 3(b). Surprisingly and unexpectedly, this effect is not detrimental for the wearer as it occurs at the bottom of the lens, in a region that is typically cut out when glazing the lenses to adapt to an ophthalmic frame.

Mathematically, to achieve the improved progressive lens, the prior art merit function $\Phi_0$ is modified according to the following formula in which the final addend is modified to use $M'_c$ rather than $M_c$.

$$\Phi'_0 = \sum_{i=1}^{N} \alpha_i (C_i - C_{0i})^2 + \sum_{i=1}^{N} \beta_i (A_i - A_{0i})^2 +$$

$$\sum_{i=1}^{N} \gamma_i (S_i - S_{0i})^2 + \sum_{k=1}^{M'_c} \delta_k C_k^2 + \sum_{k=1}^{M_c} \epsilon_k (S_k - S_{0k})^2$$

The modification of $\Phi'_0$ is the number of gaze directions used to force the cylinder to be zero on the principal meridian. Instead of $M_c$ points as in the traditional prior art merit function, the method described herein uses a smaller number of points $M'_c$. The set $M'_c$ is similar to $M_c$ in the prior art, but sight directions going through the principal meridian and passing a preferred distance (or limit distance) below the near reference point or below are removed. In one embodiment, the preferred distance is 4 mm. In other embodiments, the preferred distance is a number in the range and including the endpoints and all fractions in between the range 3 to 8. The result is that the merit function $\Phi'_0$ allows the cylinder to take any value the preferred distance (in one embodiment 4 mm, in other embodiments a value selected in the inclusive range from 3 mm to 8 mm) below the near reference point. Stated another way, the improved merit function $\Phi'_0$ does not force the cylinder to approach zero at the preferred distance (in one embodiment 4 mm, in other embodiments a value selected in the inclusive range from 3 mm to 8 mm) below the near reference point and downward along the principal meridian.

The second change to the traditional merit function calculation is to add a new term $\Phi_1$ to the merit function analysis. In this new term, the mean sphere H, is calculated according to the formula: H=S+C/2. The triplet (H, C, A) provides the same information as the traditional triplet (S, C, A) but in a different form. The following new term $\Phi_1$, the additional merit function term, is added to the traditional merit function formula.

$$\Phi_1 = \sum_{j=1}^{M} \delta_j (H_j - H_0)^2$$

In this formula, $H_j$ is the mean sphere at point j which belongs to a set of M points that satisfy, in one embodiment, the condition $C_j > 0.7 \max(C)$. That is, in this embodiment, the merit function $\Phi_1$ is computed only at those points at which the cylinder is greater than 70% of the maximum unwanted cylinder in the lens. That is, the calculation is done on a reduced range rather than the entire range. As such, this results in a merit function having a reduced mean sphere. The number $\delta_j$ is a weight that controls the effective importance of $\Phi_1$ with respect to the remaining merit function $\Phi'_0$. In another embodiment, $H_j$ is the mean sphere at point j which belongs to a set of M points that satisfy the condition $C_j > R \max(C)$, where R is from 0.6 to 0.9. That is, in this embodiment, the merit function $\Phi_1$ is computed only at those points at which the cylinder is greater than a reduced range of a selected value of from 60% to 90% of the maximum unwanted cylinder in the lens. The improved merit function is calculated as $\Phi = \Phi'_0 + \Phi_1$.

Figure 4:
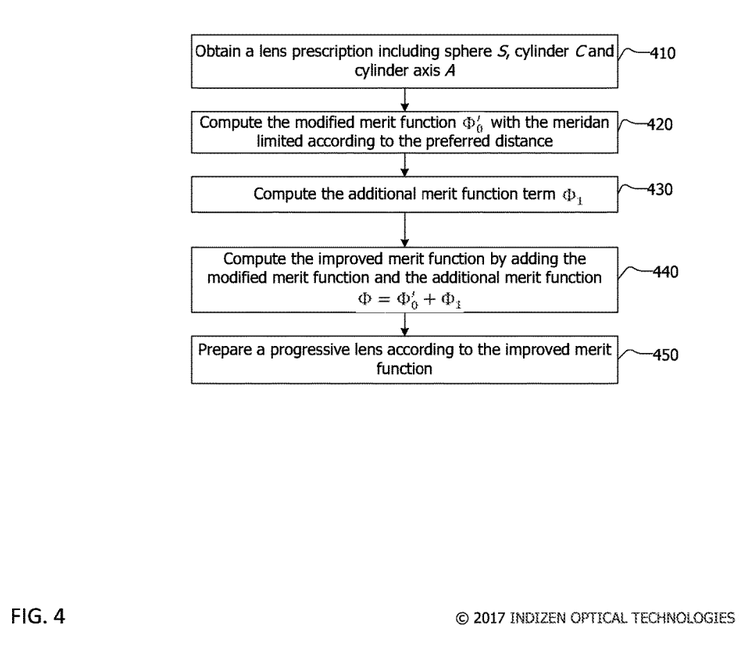
FIG. 4 is a flow chart of an improved method of calculating the configuration of a progressive addition lens.

Referring now to FIG. 4, the improved method is shown in a flow chart. A lens prescription including sphere S, cylinder C and cylinder axis A is obtained, as shown in block 410. The modified merit function $\Phi'_0$ with the meridian limited according to the preferred distance is computed, as shown in block 420 and as described above regarding the first change to the traditional merit function. The additional merit function $\Phi_1$, described above as the second change to the traditional merit function, is computed, as shown in block 430. The improved merit function having a reduced mean sphere is then calculated by adding the modified merit function and the additional merit function, namely $\Phi = \Phi'_0 + \Phi_1$, as shown in block 440. A lens is then prepared according the improved merit function, as shown in block 450.

Figure 5A:
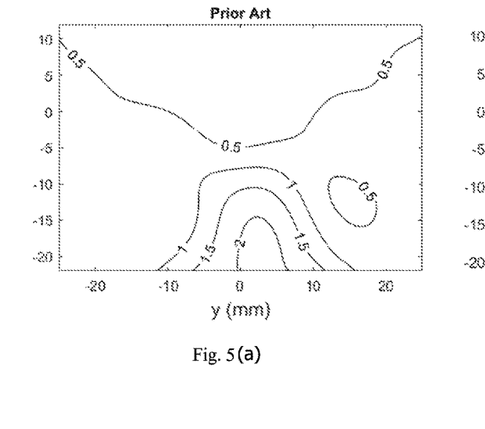
FIG. 5(a) is a graph showing a mean sphere map of a prior art lens.
Figure 5B:
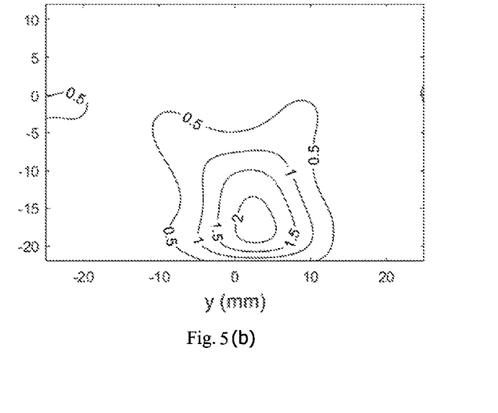
FIG. 5(b) is a graph showing a mean sphere map of a lens configured according to the improved method described herein.

The benefits of implementation of the improved process are shown in FIG. 5 in which the prior art mean sphere map of a lens shown in FIG. 5(a) is compared to the mean sphere map of a lens prepared according to the improved methods described herein shown in FIG. 5(b). The spatial average of the mean sphere is 0.80 D in the lens according to the prior art in FIG. 5(a), while the spatial average of the mean sphere is 0.37 D in the lens prepared according to the method described herein. The spatial average of the mean sphere is computed by dividing the sum of the mean sphere for all the sight directions and dividing it by the number of sight directions. The difference between the prior art and the improved method described herein is dramatic; namely, the mean sphere has been reduced by more than 50% while the usable visual field of the near region remains practically the same.

The methods described herein to configure a progressive ophthalmic lens may be implemented on a computing device that includes software and hardware. A computing device refers to any device with a processor, memory and a storage device that may execute instructions including, but not limited to, personal computers, server computers, computing tablets, smart phones, portable computers, and laptop computers. These computing devices may run an operating system, including, for example, variations of the Linux, Microsoft Windows, and Apple Mac operating systems.

The techniques may be implemented and stored as software on a machine readable storage media in a storage device included with or otherwise coupled or attached to a computing device. That is, the software may be stored on electronic, machine readable media. These storage media include magnetic media such as hard disks, optical media such as compact disks (CD-ROM and CD-RW) and digital versatile disks (DVD and DVD±RW); and silicon media such as solid-state drives (SSDs) and flash memory cards; and other magnetic, optical or silicon storage media. As used herein, a storage device is a device that allows for reading from and/or writing to a storage medium. Storage devices include hard disk drives, SSDs, DVD drives, flash memory devices, and others.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for configuring progressive addition lenses comprising:
    receiving a lens prescription including sphere S, cylinder C and cylinder axis A;
    calculating a modified merit function $\Phi'_0$ that leaves the cylinder unrestricted at any point below a preferred distance below a near reference point;
    calculating an additional merit function $\Phi_1$ wherein the additional merit function $\Phi_1$ is $$\sum_{j=1}^{M} \delta_j (H_j - H_0)^2$$

where points j at which $\Phi_1$ is evaluated are those in which the cylinder is smaller than a certain fraction of a maximum cylinder and H is a mean sphere;
    calculating an improved merit function $\Phi$ by adding the modified merit function $\Phi'_0$ and the additional merit function $\Phi_1$, namely $\Phi = \Phi'_0 + \Phi_1$;
    preparing a lens according to the results of the improved merit function $\Phi$, the preparing including incorporating the improved merit function into a lens surface description file and guiding a cutting tool to generate a surface of the lens according to the lens surface description.

2. The method of claim 1 wherein the preferred distance for the modified merit function $\Phi'_0$ is a number selected from the range 3 mm to 8 mm including endpoints and all fractions in between.

3. The method of claim 1 wherein the preferred distance for the modified merit function $\Phi'_0$ is 4 mm.

4. The method of claim 1 wherein the modified merit function $\Phi'_0$ is $$\sum_{i=1}^{N} \alpha_i (C_i - C_{0i})^2 + \sum_{i=1}^{N} \beta_i (A_i - A_{0i})^2 + \sum_{i=1}^{N} \gamma_i (S_i - S_{0i})^2 + \sum_{k=1}^{M'} \delta_k C_k^2 + \sum_{k=1}^{M'} \epsilon_k (S_k - S_{0k})^2.$$

5. The method of claim 1 wherein the additional merit function $\Phi_1$ is calculated with $H_j$ wherein j belongs to a set of M points that satisfy a condition $C_j > 0.7 \max(C)$.

6. The method of claim 1 wherein the additional merit function $\Phi_1$ is calculated with $H_j$ wherein j belongs to a set of M points that satisfy the condition $C_j > R \max(C)$, where R is selected from the inclusive range of 0.6 to 0.9.

7. The method of claim 1 wherein $\delta_j$ is a weight.

8. A lens manufactured according to the method of claim 1.

9. A computing device comprising a storage medium having instructions stored thereon which when executed by a processor in the computing device cause the processor to perform actions including:
    receiving a lens prescription including sphere S, cylinder C and cylinder axis A;
    calculating a modified merit function $\Phi'_0$ that leaves the cylinder unrestricted at any point below a preferred distance below a near reference point;
    calculating an additional merit function $\Phi_1$ $$\sum_{j=1}^{M} \delta_j (H_j - H_0)^2$$

where points j at which $\Phi_1$ is evaluated are those in which the cylinder is smaller than a certain fraction of a maximum cylinder and H is a mean sphere;

calculating an improved merit function $\Phi$ by adding the modified merit function $\Phi'_0$ and the additional merit function $\Phi_1$, namely $\Phi = \Phi' + \Phi_1$;

preparing a lens according to the results of the improved merit function $\Phi$, the preparing including incorporating the improved merit function into a lens surface description file and guiding a cutting tool to generate a surface of the lens according to the lens surface description.

10. The computing device of claim 9 wherein the preferred distance for the modified merit function $\Phi'_0$ is a number selected from the range including 3 mm to 8 mm including endpoints and all fractions in between.

11. The computing device of claim 9 wherein the preferred distance for the modified merit function $\Phi'_0$ is 4 mm.

12. The computing device of claim 9 wherein the merit function $\Phi'_0$ is $$\Sigma_{i=1}^{N} \alpha_i (C_i - C_{0i})^2 + \Sigma_{i=1}^{N} \beta_i (A_i - A_{0i})^2 + \Sigma_{i=1}^{N} \gamma_i (S_i - S_{0i})^2 + \Sigma_{k=1}^{Mc} \delta_k C_k^2 + \Sigma_{k=1}^{Mc} \in_k (S_k - S_{0k})^2.$$

13. The computing device of claim 9 wherein the additional merit function $\Phi_1$ is calculated with $H_j$ wherein j belongs to a set of M points that satisfy a condition $C_j > 0.7 \max(C)$.

14. The computing device of claim 9 wherein the additional merit function $\Phi_1$ is calculated with $H_j$ wherein j belongs to a set of M points that satisfy the condition $C_j > R \max(C)$, where R is selected from the inclusive range of 0.6 to 0.9.

15. The computing device of claim 9 wherein $\delta_j$ is a weight.

* * * * *